No. 653,273.  
E. H. WAGNER.  
PYROTECHNIC DEVICE.  
(Application filed July 13, 1897.)  
Patented July 10, 1900.

(No Model.)

WITNESSES:  
Edward Thorpe  
Arthur F. Thompson

INVENTOR  
Edward H. Wagner  
BY  
Murphey & Metcalf  
ATTORNEYS.

UNITED STATES PATENT OFFICE.

EDWARD H. WAGNER, OF NEW YORK, N. Y., ASSIGNOR TO THE EDWARD H. WAGNER COMPANY, OF NEW JERSEY.

PYROTECHNIC DEVICE.

SPECIFICATION forming part of Letters Patent No. 653,273, dated July 10, 1900.

Application filed July 13, 1897. Serial No. 644,443. (No model.)

*To all whom it may concern:*

Be it known that I, EDWARD H. WAGNER, a subject of the King of Denmark, and a resident of the city, county, and State of New York, have made certain new and useful Improvements in Pyrotechnic Devices, of which the following is a full, clear, and exact description, reference being had to the accompanying drawings, forming part of this specification.

The object of my invention is to provide a means for the safe and convenient ignition of fireworks by which they may be readily fired by the use of one hand only without the necessity of using matches or other similar means therefor; and to this end it consists in the combination and arrangement of parts and details hereinafter described, and specifically pointed out in the claim.

Figure 1:
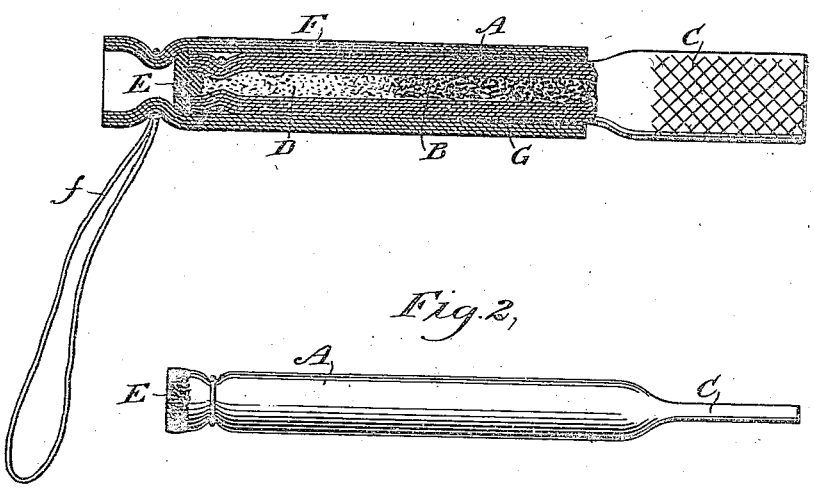
Figure 2:
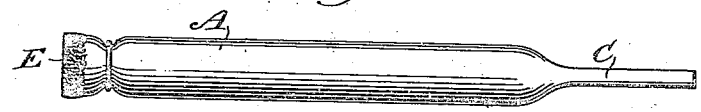
Figure 3:
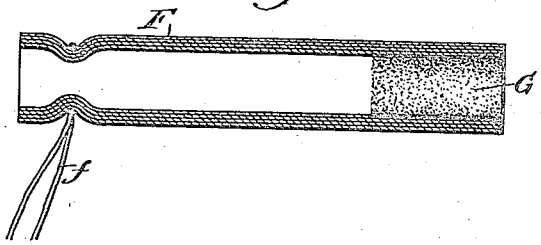

In the accompanying drawings, Figure 1 is a longitudinal sectional view of my improved device. Fig. 2 is a longitudinal elevation of the shell or cracker proper, and Fig. 3 is a sectional view of the inclosing casing.

Similar reference characters are employed to designate corresponding parts in all the views.

I have herein shown my invention as applied to a hand-cracker for the use of cyclists, observing, as hereinafter more fully stated, that the invention is not limited to any special form or use of pyrotechnic device; but for the sake of brevity I will describe the invention in such connection.

In the drawings, A is the shell of the cracker, consisting of numerous layers of paper tightly wrapped around the explosive B and provided with a flattened extension C, forming a handle for the device. A train of powder or fuse D leads from the explosive B to the upper open end of the shell, which is covered with a suitable igniting compound E—such, for instance, as that which is used for the heads of safety or other matches. The casing F is also formed of layers of paper wrapped around the shell A, and secured to its interior surface at the lower end is the striking-surface G. This striking-surface may consist of any suitable material or composition, upon which the compound E will be ignited when rubbed over it. The casing F is encircled by a looped cord $f$, by which the device may be suspended from any suitable support, such as the handle-bar of a bicycle.

The shell A is covered with a smooth-surfaced paper, so as to form a structure separable from the casing F, which is wrapped around the shell A only tightly enough to permit the shell A to be drawn out of it by a sharp pull on the handle C. If desired, they may be more firmly secured by pasting a layer of thin and readily-severable paper around the juncture of the two parts at the bottom of the casing or covering the device with thin metallic foil.

In order to fire the device, the loop $f$ is placed over any suitable support. The handle C is firmly grasped between the thumb and finger, and by giving it a sharp pull the handle and shell A will be drawn out of the casing F, the igniting compound E being drawn over the friction-surface G, and thus ignited. The flame will communicate, by means of the fuse or powder D, with the explosive compound B. As the powder D burns it will throw out a shower of sparks and emit a prolonged hissing noise, and when the flame reaches the explosive B it will explode with a loud report.

My device is particularly adapted to the use of cyclists and serves admirably as a protection against the attacks of vicious dogs. The suspending device secured thereto permits it to be hung from the handle-bar of a cycle in convenient position for the rider, so that when occasion arises for its use the handle or lower part of the device may be grasped by one hand and by a slight pull fired by the use of one hand only without removing the other hand from the handle-bar or losing control of the wheel.

Having thus described my invention, what I claim as new, and desire to secure by Letters Patent, is—

A pyrotechnic device consisting of two separable parts, one of which carries the pyrotechnic charge and the other of which is provided with a suspending device and forms an inclosing casing for the other part, means by which the part carrying the charge may be pulled out of the inclosing case, a striking-surface on one of said parts and an igniting compound on the other part, whereby the parts may be separated and the ingniting compound and striking-surface brought into contact by the use of one hand only, substantially as shown and described.

EDWARD H. WAGNER.

Witnesses:
S. G. METCALF,
ARTHUR F. THOMPSON.